Sept. 24, 1957     A. E. DEELEY-JONES     2,807,491
DUAL HOOD LATCH
Filed Dec. 31, 1953     3 Sheets-Sheet 2
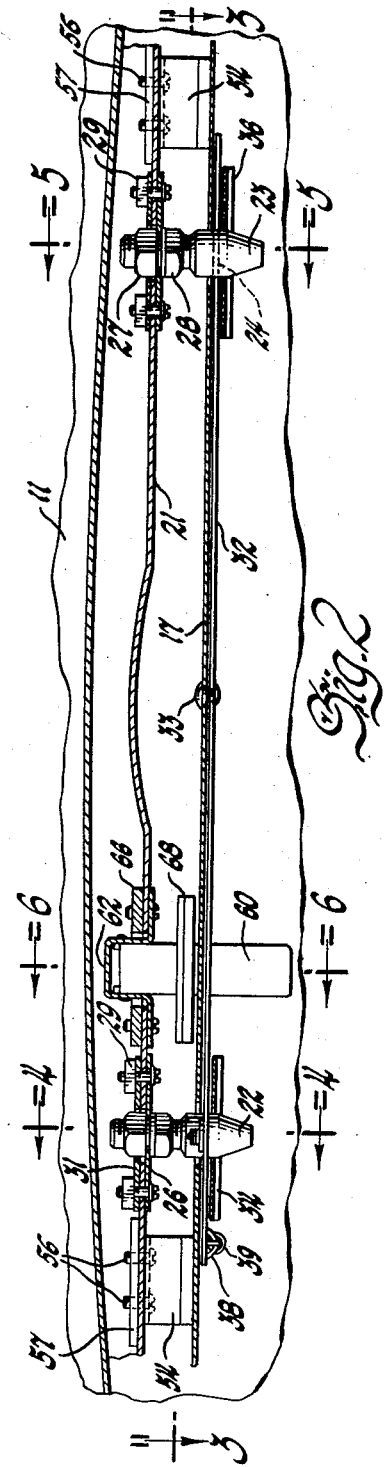
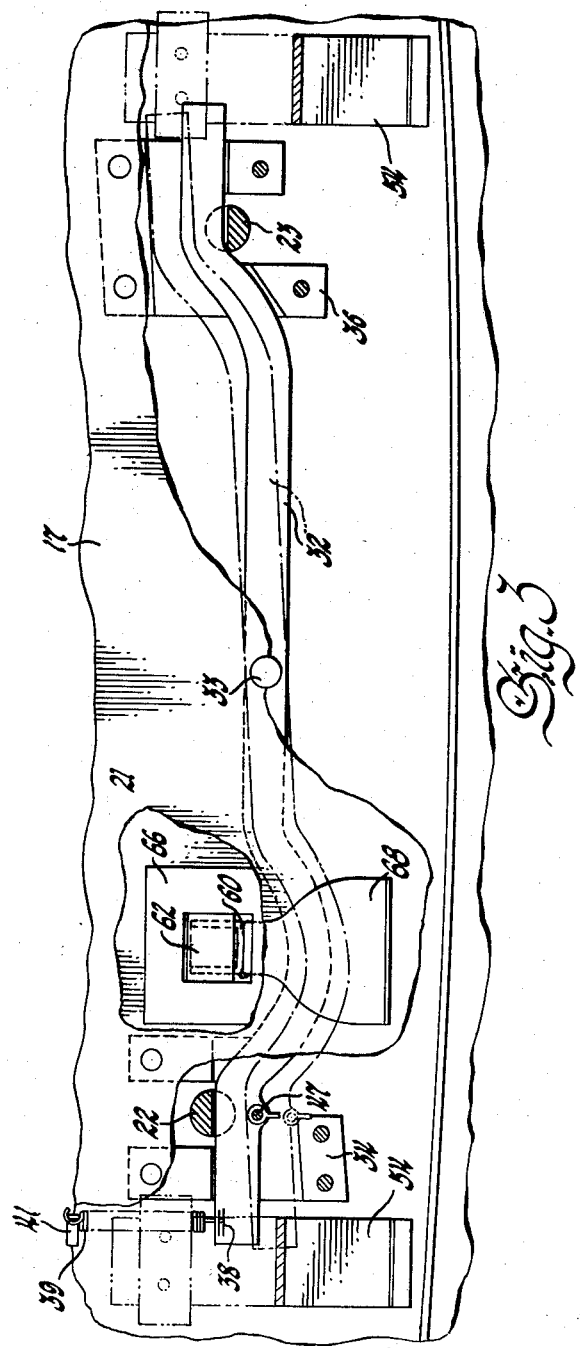
INVENTOR
Arnold E. Deeley-Jones
BY
Paul Fitzpatrick
ATTORNEY INVENTOR
Arnold E. Deeley-Jones
BY
Paul Fitzpatrick
ATTORNEY

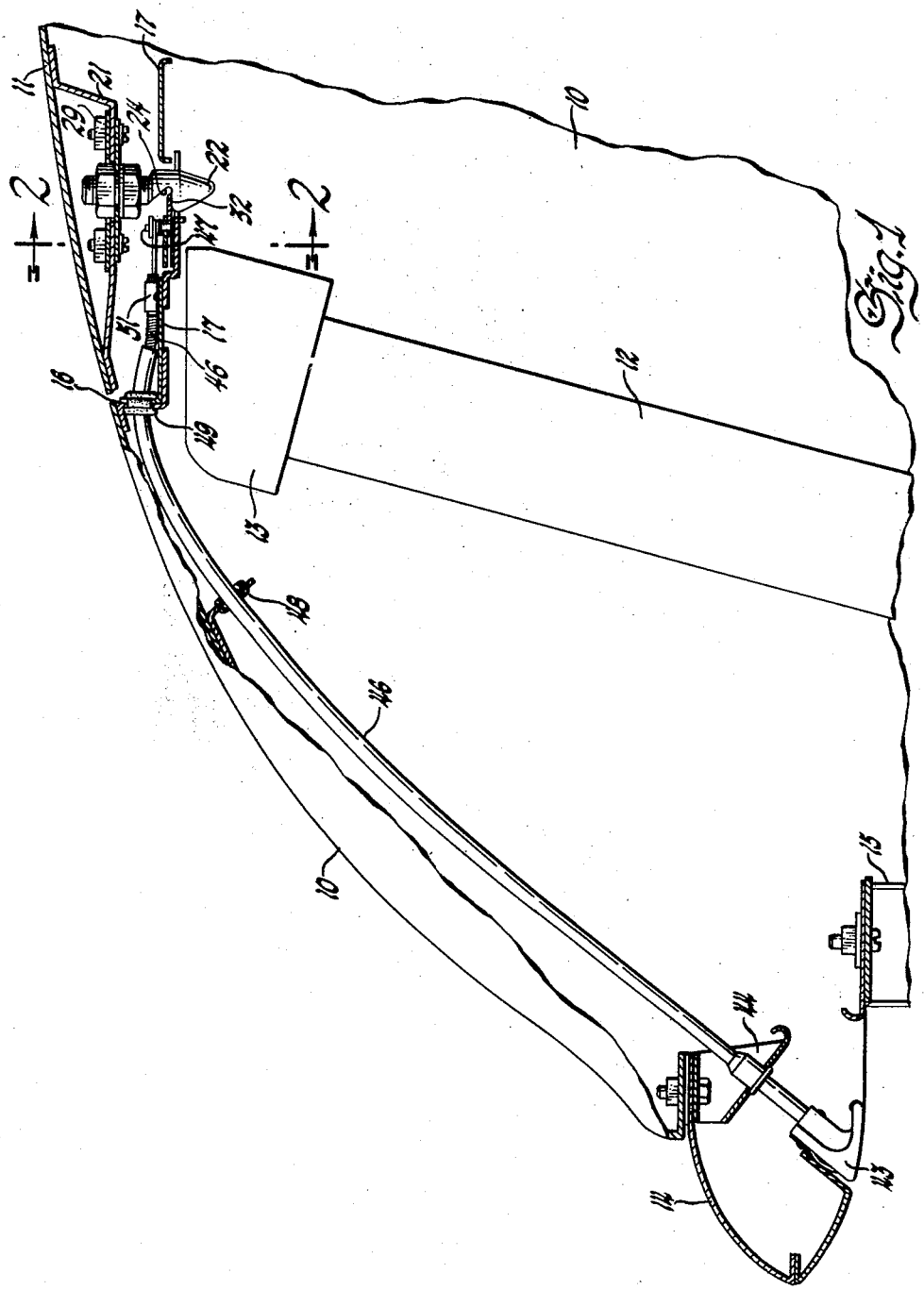

United States Patent Office 2,807,491
Patented Sept. 24, 1957

2,807,491

DUAL HOOD LATCH

Arnold E. Deeley-Jones, Detroit, Mich., assignor to General Motors Corporation, Detroit, Mich., a corporation of Delaware Application December 31, 1953, Serial No. 401,534

1 Claim. (Cl. 292—304)

My invention relates to a latching structure particularly adapted for the lids of automobile hoods but which, of course, may find other applications. The hood latch of the invention is particularly suited to rather flat flexible hood lids or doors in that it provides a catch at each of the two front corners of a conventional alligator type hood lid which lifts about a hinge axis near the rear of the hood.

Among the advantages of the invention are mechanical simplicity, reliability, and ease of operation. The nature of the invention and the advantages thereof will be more clearly appreciated by reference to the succeeding detailed description of the preferred embodiment of the invention and the accompanying drawings, in which:

Fig. 1 is a partial view of the front end of an automobile taken principally in section along a vertical longitudinal plane of the automobile;

Fig. 2 is a transverse vertical sectional view taken on the plane indicated in Fig. 1;

Fig. 3 is a horizontal sectional view taken on the plane indicated in Fig. 2;

Figure 4:
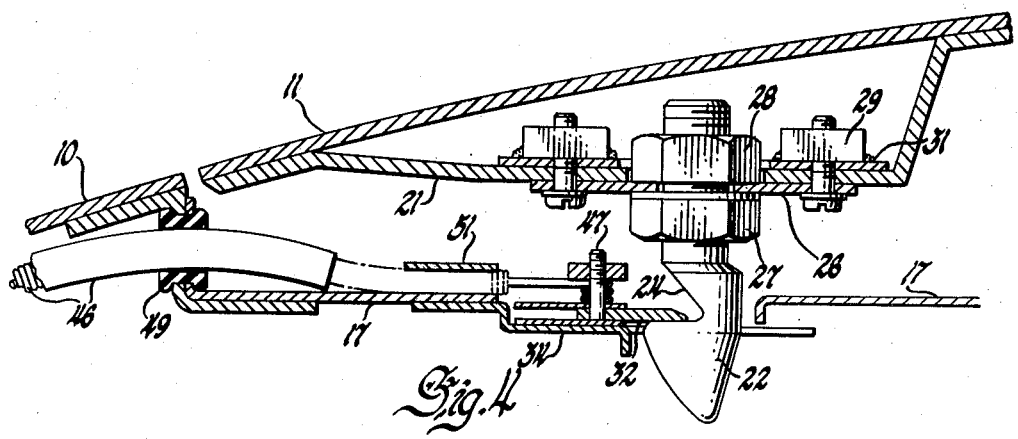
Fig. 4 is a sectional view through the right hand catch taken on the plane indicated in Fig. 2.
Figure 5:
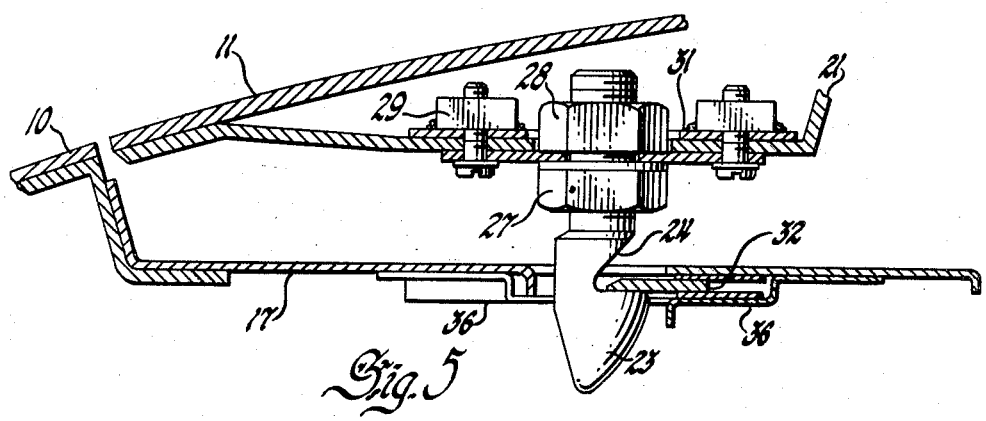
Fig. 5 is a sectional view through the left hand catch taken on the plane indicated in Fig. 2.

Referring more particularly to Fig. 1, the structure comprises a hood or engine house 10, the upper surface of which is closed by a hood door or lid 11 which may be hinged in any suitable manner at the rear by typical hood hinges (not shown). Within the forward part of the hood is a radiator 12 with a header 13. The front end of the hood terminates in a bumper or grille bar 14 below which is the air intake grille 15. Extending across the hood immediately below and to the rear of the front edge of the door opening 16 is a shelf or panel 17 fixed to the hood structure. A hood lid reinforcing plate 21 extends across the forward end of the lid 11 and is bonded to the lid at the forward and rearward edges of the plate. Keepers 22 and 23 extend downwardly from the reinforcing plate 21 through openings in the shelf 17. Each keeper is formed with a notch 24, which is directed forwardly in the keeper 22 and rearwardly in the keeper 23. The keepers may be identical except for their orientation and are mounted in the same way. Each has a threaded shank which is fixed to a plate 26 by nuts 27 and 28 on opposite sides of the plate. Plate 26 is secured by machine screws to nuts 29 clipped onto a plate 31 bonded to the upper side of the reinforcing plate 21. It will be apparent that this mounting permits adjustment of the orientation and vertical position of each keeper. The notches 24 of the keepers 22 and 23 are engaged by a common latch bar 32 mounted immediately below the panel 17 and rockable about the fulcrum provided by a rivet 33 extending through the panel as shown most clearly in Figs. 2 and 3. The outer ends of the latch bar 32 move between the shelf 17 and forked support plates 34 and 36 riveted or otherwise fixed to the shelf. As will be most clearly apparent from Fig. 3, these support plates straddle the keepers 22 and 23 and prevent downward deflection of the ends of the latch bar 32 when it is engaged by the ends of the keepers as the hood is closed. The right hand end of the latch bar 32 is lanced at 38 to provide a point of attachment for a tension spring 39, the other end of said spring being attached to a bracket 41 on the panel 17. Spring 39 normally holds both latches engaged. The hood door may be released by pulling on a releasing member 43 (Fig. 1) mounted on a bracket 44 fixed to the grille bar 14. Member 43 when pulled forwardly acts through a Bowden wire 46, the other end of which is attached to a pin 47 fixed to the right hand end of the latch bar 32. The Bowden wire is supported in grommets 48 and 49 mounted under the hood and the end is held by a clamp 51 fixed to the shelf 17.

By pulling forwardly on the finger grip 43, the latch bar is rotated and drawn out of the notches in the keepers 22 and 23. The hood is urged upwardly into a partially open position by cantilever leaf springs 54 mounted on the reinforcement 21 outboard of keepers 22 and 23 and extending into engagement with the shelf 17.

These leaf springs are mounted on the reinforcement 21 by machine screws 56 (Fig. 2) going through the reinforcement 21 into a tapping plate 57 on each side of the hand bonded to the part 21.

Figure 6:
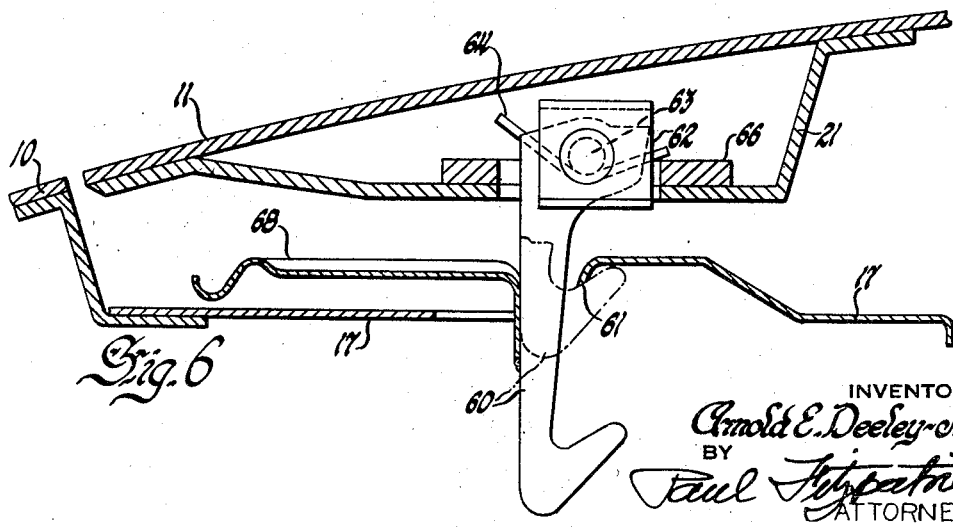
Fig. 6 is a sectional view of the safety catch taken on the plane indicated in Fig. 2.

The upward movement of the hood when the latches are released is limited by the safety catch 60 shown most particularly in Fig. 6. The hook-shaped catch 60 engages a lip 61 on the panel 17 as shown by the broken line indication of the end of the hook in Fig. 6. Catch 60 is pivoted on a sheet metal bracket 62 by a rivet 63 and is urged counterclockwise as shown in Fig. 6 by a coil spring 64. The bracket 62 is fastened by machine screws to a tapping plate 66 bonded to the reinforcement 21. The safety catch is released from the lip 61 by pulling upwardly on a plate 68 welded to the hook 60 which is accessible when the hood is moved upward slightly.

The operation and the advantages of the hood latch mechanism should be apparent from the foregoing description. The hood is held at both front corners and may be mounted for rotation at the two rear corners so that it is held by all four corners on the vehicle, which permits the use of a lighter and more flexible or a flatter hood lid as desired. Although two latches are provided, the structure involved is very simple and only one release mechanism is needed.

The description herein of the preferred embodiment of the invention for the purpose of explaining the principles thereof is not to be considered as limiting or restricting the invention as many modifications may be made therein by the exercise of mere skill in the art.

I claim:

A latch mechanism adapted to hold a lid member releasably in closed relation to a body member, the latch mechanism comprising two keepers adapted to be mounted on one of the members in mutually spaced relation projecting toward the other member, the keepers having oppositely oriented notches therein, a panel adapted to be mounted on the other of said members, the panel having openings therein to receive the keepers, a catch pivoted on the panel intermediate the keepers and rotatable into engagement within the notches of the keepers, spring means connected to the catch biasing the catch into such engagement, means connected to the catch for moving the catch against the bias of the spring to release the catch from the keepers, the keepers including cam surfaces adapted to displace the catch against the spring bias when the keepers engage the catch upon approach of the lid member to the body member, and spring means adjacent each keeper engaging the members and biasing the members apart when they are in closed relation.

References Cited in the file of this patent

UNITED STATES PATENTS

| | | |
|---|---|---|
| 830,073 | Hovas | Sept. 4, 1906 |
| 1,737,627 | Wear | Dec. 3, 1929 |
| 2,243,758 | Krause | May 27, 1941 |
| 2,697,625 | Krause | Dec. 21, 1954 |
| 2,756,086 | Wade | July 24, 1956 |

FOREIGN PATENTS

| | | |
|---|---|---|
| 640,543 | France | Apr. 2, 1928 |